Figure 1:
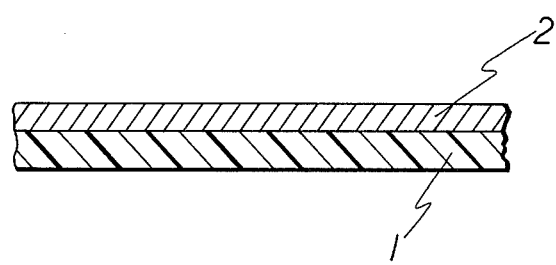

United States Patent [19]

Tokunaga et al.

[11] Patent Number: 4,463,034
[45] Date of Patent: Jul. 31, 1984

[54] HEAT-SENSITIVE MAGNETIC TRANSFER ELEMENT

[75] Inventors: Yukio Tokunaga; Yasuhisa Ikeda, both of Yokosuka; Tadao Seto, Matsudo; Yoshikazu Shimazaki, Osaka, all of Japan

[73] Assignees: Nippon Telegraph & Telephone Public Corp., Tokyo; Fuji Kagakushi Kogyo Co., Ltd., Osaka, both of Japan

[21] Appl. No.: 358,033

[22] Filed: Mar. 15, 1982

[30] Foreign Application Priority Data

Apr. 21, 1981 [JP] Japan ................................ 56-60961

[51] Int. Cl.³ .............................................. B41M 5/26
[52] U.S. Cl. ........................................ 427/256; 360/1; 360/131; 427/128; 427/130; 428/206; 428/216; 428/323; 428/328; 428/329; 428/484; 428/692; 428/694; 428/900; 428/913; 428/914

[58] Field of Search ............. 360/1, 2, 134, 131; 428/206–209, 329, 484, 488, 692, 900, 913, 914, 212, 213, 215, 216, 323, 328, 694; 400/241, 241.1; 401/1, 52; 427/48, 128, 130, 197, 199, 256

[56] References Cited

U.S. PATENT DOCUMENTS 3,284,360 11/1966 Peshin ............................... 428/900
3,496,015 2/1970 Newman et al. ................... 428/914
3,663,278 5/1972 Blose et al. ......................... 428/900

FOREIGN PATENT DOCUMENTS 97030 7/1980 Japan ................................. 428/900

Primary Examiner—Bruce H. Hess
Attorney, Agent, or Firm—Armstrong, Nikaido, Marmelstein & Kubovcik

[57] ABSTRACT

Heat-sensitive magnetic transfer element for printing a magnetic image to be recognized by a magnetic ink character reader (MICR), comprising a heat-resisting foundation and a heat-sensitive transferring layer provided on the foundation, the transferring layer which includes a ferromagnetic substance powder and has a melting point of 50° to 120° C. being readily melted and transferred on a receiving paper in the form of magnetic image by a thermal printer.

6 Claims, 2 Drawing Figures

:::

HEAT-SENSITIVE MAGNETIC TRANSFER ELEMENT

BACKGROUND OF THE INVENTION

The present invention relates to a heat-sensitive magnetic transfer element and more particularly to a heat-sensitive magnetic transfer element which allows a thermal printer to prepare a printed magnetic image recognized by a magnetic ink character reader.

The magnetic ink character reader (hereinafter referred to as MICR) can read and recognize the certain printed magnetic image, such as character, or mark, which is printed to bill, check, credit card, pass, traffic census card, or the like. A magnetic head in the MICR converts the variations of magnetic portions corresponding to various characters and marks into predetermined signals, and voltages are detected to recognize the characters and marks.

In that case, it is necessary that each of the characters and marks to be read by the magnetic head has a certain shape, dimensions and allowable ranges of dimensions in addition to the certain magnetic signal levels. Therefore, the allowable ranges as to E13B type face employed in American Bank Association are defined in JIS C 6251 (Japanese Industrial Standard).

E13B type face defined in JIS C 6251 consists of 10 numbers (0 to 9) and 4 special marks. According to JIS C 6251, a character height, a character width, a corner radius, allowable ranges of those and an allowable range of a void with respect to each character are described. In addition to E13B type face, CMC7 type face is well known as type face for MICR. CMC7 type face is formed by arranging 7 longitudinal bars with 2 kinds of intervals, and each of CMC7 type faces can be magnetically recognized by combinations of 2 kinds of intervals. Thus, CMC7 type faces consist of 10 numbers, 26 large alphabets and 5 special marks, and dimensions and magnetic property of CMC7 type face are determined by European Computer Manufactures Association.

The printed image of the above type face for MICR is formed by transferring a magnetic ink onto a receiving paper by an impact printer such as typewriter. The magnetic ink including a magnetic substance powder is coated and dried on a foundation such as plastic film to form a pressure-sensitive magnetic transfer element. Such a pressure-sensitive magnetic transfer element is disclosed in, for example, Japanese Patent Publication No. 21449/1970.

However, the use of the pressure-sensitive magnetic transfer element results in generating noise due to impact system, and further cannot perform high printing speed. In addition, the above transfer element tends to generate voids in the printed magnetic image.

OBJECTS OF THE INVENTION

A main object of the invention is to provide a heat-sensitive magnetic transfer element which can easily produce a printed magnetic image by a thermal printer with high printing speed without generating noise.

Another object of the invention is to provide a heat-sensitive magnetic transfer element which can produce a printed magnetic image having high accuracy of dimensions and high magnetic properties.

Other objects and advantages of the invention will become apparent from the following descriptions with reference to the accompanying drawings.

BRIEF DESCRIPTION OF THE INVENTION

Figure 2:
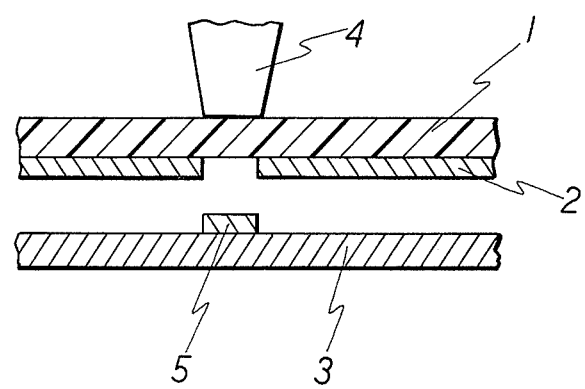

FIG. 1 is a schematically sectional view for showing an embodiment of a heat-sensitive magnetic transfer element of the invention; and FIG. 2 is a explanatory view for showing a printing method using a heat-sensitive magnetic transfer element of the invention.

DETAILED EXPLANATION OF THE INVENTION

FIG. 1 shows a heat-sensitive magnetic transfer element according to the invention comprising a heat-resisting foundation 1, and a heat-sensitive transferring layer 2 including a ferromagnetic substance powder and having a melting temperature of 50° to 120° C., which is measured at a heating-up velocity of 40° C./min. by Meihosha-type melting point measuring device available from Meihosha Factory Ltd.

The heat-sensitive transferring layer 2 is one layer formed by uniformly admixing a binder material of wax and/or thermoplastic resin including, if necessary, additives such as fat and oil, extender pigment, or dispersant, with the magnetic substance powder. Such a transferring layer can be obtained by means of hot-melt coating or solvent coating.

The magnetic substance powder is preferably included in the heat-sensitive transferring layer 2 at a range of 30 to 97% by weight per total amount of the transferring layer 2. When the magnetic substance powder content is less than the above range, the magnetic properties of the printed image are lowered, whereby reading of MICR becomes difficult. On the other hand, when the magnetic substance powder content is more than the above range, the melt-transfer property of the transferring layer 2 and the adhesion strength of the printed image against the image receiving paper are lowered.

In the case that the heat-sensitive transferring layer 2 is provided on the heat-resisting foundation 1 by means of hot-melt coating, wax is preferably employed as a main ingredient of the binder material to prepare the heat-sensitive transferring layer. In that case, 30 to 97% by weight of the ferromagnetic substance powder, 20 to 70% by weight of wax, 0 to 30% by weight of thermoplastic resin, 0 to 30% by weight of fat and oil, 0 to 30% by weight of extender pigment and 0 to 2% by weight of dispersant are used per total amount of the heat-sensitive transferring layer 2.

In the case that the heat-sensitive transferring layer 2 is provided on the heat-resisting foundation 1 by means of solvent coating, 30 to 97% by weight of the ferromagnetic substance powder, 0 to 20% by weight of wax, 20 to 70% by weight of thermoplastic resin, 0 to 30% by weight of fat and oil, 0 to 30% by weight of extender pigment and 0 to 2% by weight of dispersant are used per total amount of the heat-sensitive transferring layer, and are homogeneously dispersed in organic solvent such as toluene, methyl ethyl ketone, methyl isobutyl ketone, cyclohexane, butyl butyrate, dioxane, or ethyl-benzene.

An example of the ferromagnetic substance powder is $\gamma\text{-}Fe_2O_3$, $\gamma\text{-}Fe_2O_3$ including Co, $Fe_3O_4$, $Fe_3O_4$ including Co, $CrO_2$, Co-Cr alloy, Co-Fe alloy, Co-Ni-P alloy, Co-Ni-Fe alloy, Co-Ni-Fe-B alloy, Co-Ni-Zn alloy, Fe-Mn-Zn alloy, Fe-Co-Ni-Cr alloy, Fe-Co-Ni-P alloy, Ni-Co alloy, or the like. The aspect ratio (L/D) of the ferromagnetic substance powder mentioned above is 5:1 to 20:1, more preferably 5:1 to 10:1, and the diameter of the same is 0.01 to 1μ, more preferably 0.02 to 0.5μ. Furthermore, the length of the ferromagnetic substance powder is preferably 0.05 to 20μ, more preferably 0.1 to 5μ.

An example of wax is one or more of carnauba wax, montan wax, paraffin wax, microcrystaline wax, bees wax, or the like. Due to wax contained in the heat-sensitive transferring layer 2 as a binder material, the melt-transfer property of the transferring layer 2 obtained can be effectively increased. Thus, the transferred magnetic image 5 prepared is free from the void and the break, and further has an excellent adhesion on the receiving paper 3. Accordingly, it is especially preferable that wax is contained in the heat-sensitive transferring layer 2.

An example of the thermoplastic resin is polyvinyl chloride, polyvinyl acetate, vinyl chloride-vinyl acetate copolymer, polyethylene, polypropylene, polyacetal, ethylene-vinyl acetate copolymer, polystyrene, low molecular weight polystyrene, polyacrylic ester, polyamide, ethyl cellulose, or the like. Furthermore, epoxy resin, xylene resin, ketone resin, petroleum resin, rosin or the derivatives thereof, cumarone-indene resin, terpene resin, polyurethane, synthetic rubber such as styrene-butadiene rubber, polyvinyl butyral, nitrile rubber, polyacrylate rubber, ethylene-propylene rubber, or the like can be also preferably employed.

An example of the above fat and oil is animal oil, vegetable oil, mineral oil, dioctyl phthalate, tricresyl phosphate, dibutyl phthalate, or the like.

An example of the above extender pigment is calcium carbonate, magnesium carbonate, diatomaceous earth, kaolin, white carbon, silicic acid powder, or the like. Furthermore, an example of the dispersant is nonionic surface active agent such as di(polyoxyethylene alkylether)phosphate, tri(polyoxyethylene alkylether)phosphate, polyoxyethylene stearylamine, polyoxyethylene laurylether, polyoxyethylene oleylether, polyoxyethylene cetylether, polyoxyethylene stearylarylether, or the like.

The heat-sensitive transferring layer 2 thus obtained has preferably a thickness of 2 to 25μ, and the heat-resisting foundation 1 has preferably a thickness of 3 to 40μ.

An example of the heat-resisting foundation is a plastic film such as polyester, moisture-protected cellophane, polycarbonate, nylon, polypropylene, or a paper such as condenser paper, glassine paper.

The heat-sensitive magnetic transfer element of the invention is overlapped with the receiving paper 3 such as check, and then is printed by a thermal head 4 of the thermal printer as shown in FIG. 2, whereby the magnetic image 5 is melted and transferred on the receiving paper 3.

In that case, the heat-sensitive transferring layer 2 according to the invention can be correctly transferred only in the portion of the transferring layer 2 corresponding to the heating and printing portion of the thermal head 4, because the heat-sensitive transferring layer 2 is a melting temperature of 50° to 120° C., and therefore is superior in the heat-transfer property and the adhesion property. As a result, the magnetic image prepared has a very sharp profile without causing the void, the break of the character and the smudge of the receiving paper 3.

In particular, the magnetic image 5 thus obtained has a high accuracy in dimension to ensure the reading operation of MICR so that a high reliability can be offered.

In addition, the invention has also significant advantages that a high-speed printing can be performed without generating noise, and the preparation of bill, check, credit card, pass, traffic census card, or the like can be readily and rapidly carried out, since the magnetic image 5 is prepared by using the thermal printer.

Further, the magnetic image obtained in the invention is not limited to only the certain type face such as E13B or CMC7 mentioned above, and other certain characters are also readily prepared from the heat-sensitive magnetic transfer element by means of the thermal printer.

The invention is more particularly described and explained by means of the following Examples.

EXAMPLE 1

A composition of heat-sensitive transferring layer described below was uniformly admixed and was applied on a polyester film having a thickness of 6μ by means of hot-melt coating to obtain a heat-sensitive transferring layer having a melting temperature of 68° C. and a thickness of 6μ.

| Ingredients | Parts by Weight |
|---|---|
| $\gamma\text{-}Fe_2O_3$ | 200 |
| Coercive force: 1200 Oe | |
| Diameter: 0.4 μ | |
| Length: 1 μ | |
| Carnauba wax | 15 |
| Paraffin wax | 32 |
| (melting point: 68° C.) | |
| Ethylene-vinyl acetate copolymer | 3 |
| Vaseline | 5 |

The magnetic transfer element thus obtained was overlapped with a fine paper, and then was printed by thermal printer commercially-available from Oki Electric Industry Co., Ltd. under "Thermal Printer 200" at a printing speed of 30 characters per second so that the heat-sensitive transferring layer is melted and transferred on the fine paper to form magnetic images.

EXAMPLE 2

A composition of heat-sensitive transferring layer described below was uniformly admixed, and then was applied and dried on a condenser tissue to obtain a heat-sensitive transferring layer having a melting temperature of 90° C. and a thickness of 8μ.

| Ingredients | Parts by Weight |
|---|---|
| $Fe_3O_4$ | 68 |
| Coercive force: 1100 Oe | |
| Diameter: 0.2 μ | |
| Length: 0.5 μ | |
| Solprene T | 4.5 |
| (styrene-butadiene rubber available from Asahi Chemical Industry Co., Ltd.) | |
| Arkon P-90 | 8.0 |
| (saturated alicyclic hydrocarbon resin available from Arakawa Kagaku Kogyo Kabushiki Kaisha) | |
| Hoechst wax V | 2.5 |
| (Hoechst AG) | |
| Toluene | 50 |
| Solvent naphtha | 25 |
| (boiling point: 125° C.) | |

The magnetic transfer element thus obtained was overlapped with a check paper, and then was printed by the same thermal printer as in Example 1 at a printing speed of 30 characters per second to melt and transfer the heat-sensitive transferring layer in the form of magnetic images on the paper.

As a result, dimensions of each magnetic image prepared in Examples 1 and 2 (character height, character width and line width) were included within the allowable ranges defined in JIS C 6251.

Also, voids existing in the magnetic images were determined by observing whether single void is included within a square gauge of 0.203 mm.×0.203 mm. In that case, the void existing in a line having a width of 0.660 mm. or more was determined by employing a square gauge of 0.254 mm.×0.254 mm. according to the definition of JIS C 6251. The results are shown in the following Table.

Furthermore, magnetic properties (coercive force, residual magnetic flux density and relative signal level) of each magnetic image prepared in Examples 1 and 2 are also shown in the same Table.

In that case, the relative signal level is determined by measuring a signal level with a MICR tester (commercially-available from Kidder Press Company Inc. under "Kidder Magnetic Character Tester") defined in JIS C 6251, and then calculating a percentage of the measured signal level against the standard signal level with reference to the same character. The relative signal level must be within a range of 50 to 200% against the standard signal level of the examined character.

TABLE

|  | | Magnetic properties | | |
| --- | --- | --- | --- | --- |
|  | Voids | Coercive force (Oe) | Residual magnetic flux density (G) | Relative Signal level (%) |
| Ex. 1 | none | 340 | 1700 | 110 |
| Ex. 2 | none | 330 | 1850 | 105 |

In addition to the elements or ingredients used in Examples, other elements or ingredients can be used in Examples as set forth in the specification to obtain substantially the same results.

Variations and modifications will be apparent to a person skilled in the art in the light of the present disclosure and within the scope of the present claims.

What we claim is:

1. A process for printing a magnetic image to be recognized by a magnetic ink character reader on a receiving medium, which comprises the steps of:

providing a heat-sensitive magnetic transfer element comprising a heat-resisting foundation and a heat-sensitive transferring layer provided on the foundation, said transferring layer comprising a ferromagnetic substance powder and a binder material, the amount of the ferromagnetic substance powder being from 30 to 97% by weight per the total amount of the transferring layer, the binder material consisting essentially of a member selected from the group consisting of a wax and a mixture of a wax and a thermoplastic resin, and the transferring layer having a melting temperature of 50° to 120° C.;

superimposing the transfer element over a receiving medium so that the transferring layer of the element is brought to come into contact with the receiving medium; and applying the heat from a thermal head of a thermal printer to the transfer element whereby the portions of the transferring layer corresponding to the areas heated with the thermal head were melted and transferred onto the receiving medium to give a magnetic image.

2. The process of claim 1, wherein the thickness of the foundation is from 3 to 40μ, and that of the transferring layer is from 2 to 25μ.

3. The process of claim 1, wherein said binder material is a wax.

4. The process of claim 3, wherein said wax is a member selected from the group consisting of carnauba wax, montan wax, paraffin wax, microcrystalline wax, bees wax and mixtures thereof.

5. The process of claim 1, wherein said binder is a mixture of a wax and a thermoplastic resin.

6. The process of claim 5, wherein said binder is a mixture of a wax, a styrene butadiene rubber and a saturated alicyclic hydrocarbon resin.

* * * * *